July 11, 1950
E. G. GRIESE
2,514,487
COMPOUND PROPELLER BLADE
Filed Sept. 27, 1946
2 Sheets-Sheet 1
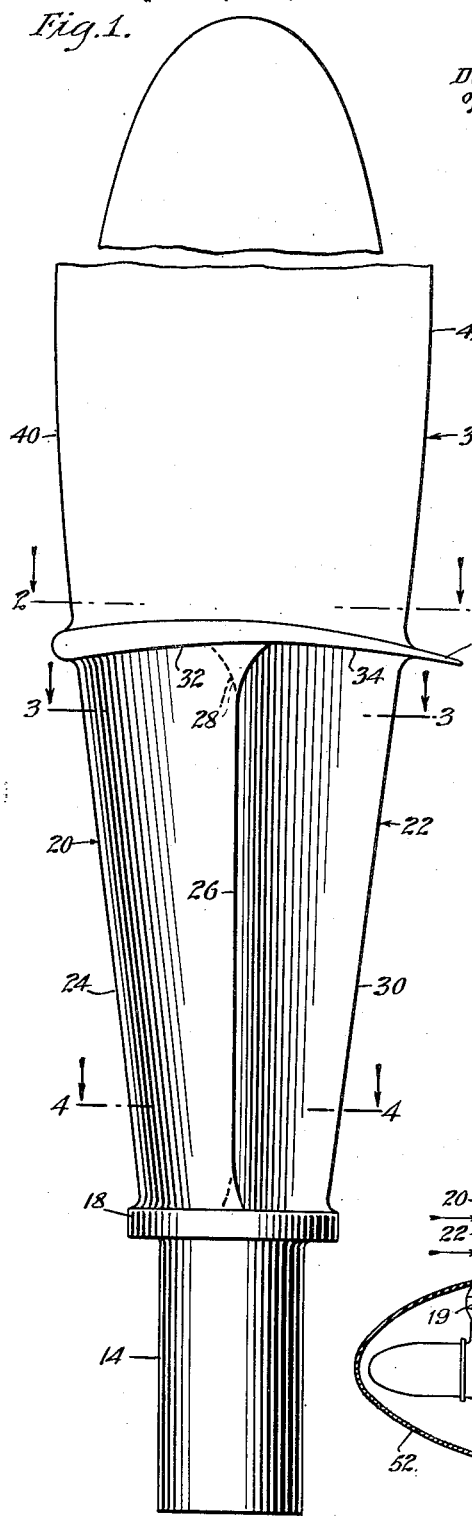
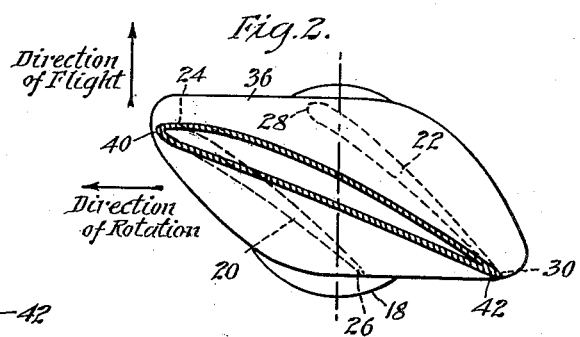
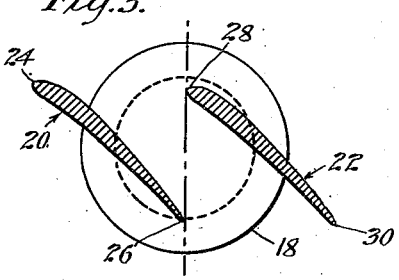
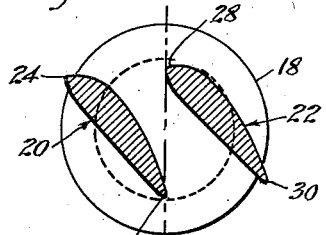
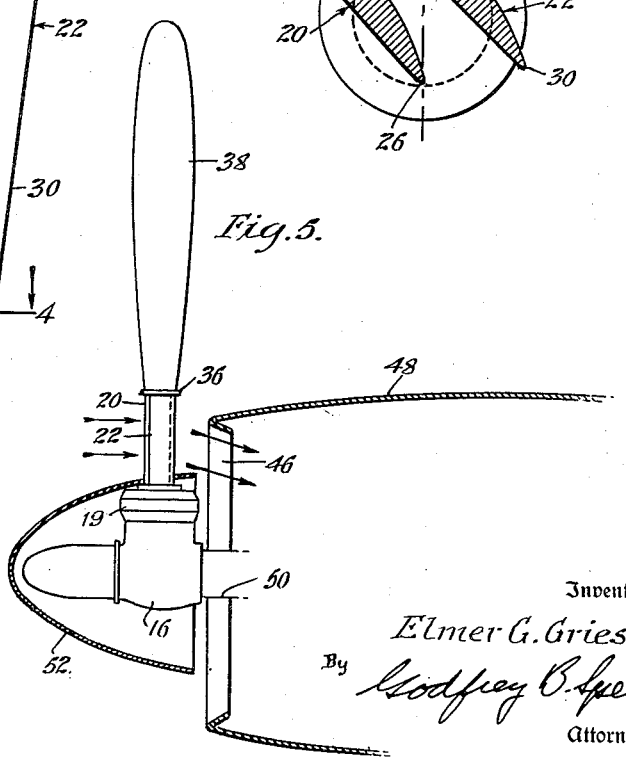
Inventor
*Elmer G. Griese*
By *Godfrey B. Speir*
Attorney July 11, 1950     E. G. GRIESE     2,514,487
COMPOUND PROPELLER BLADE
Filed Sept. 27, 1946     2 Sheets-Sheet 2
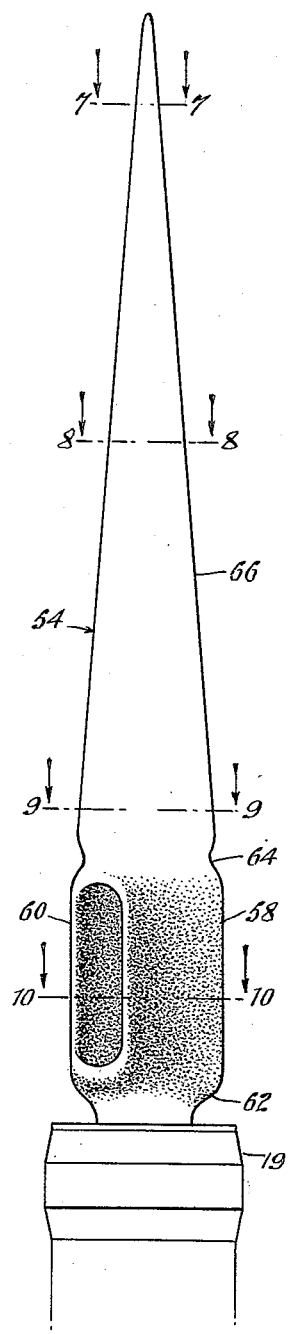
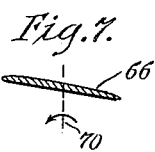
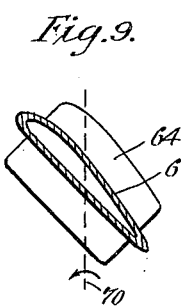
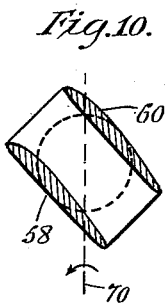
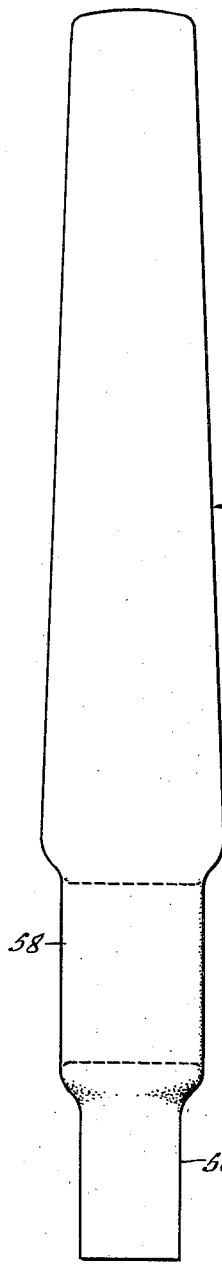
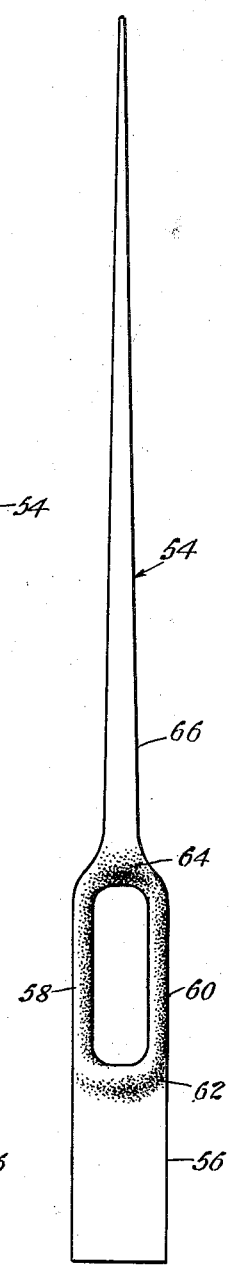
Inventor
Elmer G. Griese
By Godfrey B. Speir
Attorney Patented July 11, 1950

2,514,487

UNITED STATES PATENT OFFICE 2,514,487

COMPOUND PROPELLER BLADE

Elmer G. Griese, Caldwell, N. J., assignor to Curtiss-Wright Corporation, a corporation of Delaware Application September 27, 1946, Serial No. 699,607

1 Claim. (Cl. 170—166)

This invention relates to aeronautical propellers and is concerned particularly with improvements in propeller blades to increase the effectiveness of such blades in the inner shank portions thereof.

Conventional propeller blades for a number of years have comprised circular or cylindrical shank portions, the inner ends of which are secured in a propeller hub for pitch change. To provide adequate structure in the blade to support the outer portions, which are subject to high centrifugal loading, approximately the inner ⅓ of the blade gradually blends from airfoil shape to cylindrical shape wherefore the inner portion of the blade is substantially ineffective for propulsion or for blowing air rearwardly to augment cooling of engines normally disposed behind the propeller. Various means have been evolved to increase the efficiency of blade inner portions including the provision of cuffs embracing the blade shanks, whereby the cylindrical shank is converted to a more or less streamlined form. The great thickness of the blade, however, in conjunction with the relatively short chord of the cuff section does not allow particularly great aerodynamic efficiency of blade inner portions. With older type blades, engine cooling efficiency, particularly at low air speed, is admittedly inadequate and improvements are continually being sought.

It is an object of this invention to provide a propeller blade having high aerodynamic efficiency near the hub, as well as having high efficiency toward the blade tip. It is a further object of the invention to provide a propeller blade whose inner portion is capable of producing positive thrust for augmentation of propulsion and/or for increasing the efficiency of cooling. It is a further object of the invention to provide a propeller blade whose entire length is effective, minimizing the need for large spinners around the propeller hub and blade shanks usually deemed necessary to reduce drag of this portion of the propeller. Still another object is to provide a compound propeller blade whose inner portion is particularly effective for blowing air for engine cooling and whose outer portion is predominantly effected for propulsion.

In general terms, the invention comprises a composite or compound propeller blade consisting of an inner circular shank portion mounted for pitch change in a propeller hub, an intermediate blade portion comprising two or more airfoils, each having pitched disposition and each comprising effective airfoils, and an outer single blade portion operating substantially in the fashion of conventional propeller blades. If desired, a baffle may be disposed between the multi-plane portions and single plane portions to minimize end loss from the multi-plane portions.

The foregoing objects are accomplished by the structural arrangement set forth in the following detailed description when taken in connection with the accompanying drawings in which Fig. 1 is an elevation of one form of propeller blade according to the invention;

Figs. 2, 3 and 4 are respectively sections on the lines 2—2, 3—3 and 4—4 of Fig. 1;

Fig. 5 is a side elevation of a propeller according to the invention as installed on a typical nacelle;

Fig. 6 is a side elevation of an alternative form of propeller blade;

Figs. 7, 8, 9 and 10 are sections respectively on the lines 7—7, 8—8, 9—9 and 10—10 of Fig. 6;

Fig. 11 is a planform elevation of the blade of Fig. 6; and

Fig. 12 is an edge form elevation of the blade of Fig. 6, Figs. 11 and 12 showing the blade in an untwisted state.

It should be appreciated that the drawings are employed for purpose of illustration only and are not designed to define the limitations of the invention, reference being had to the appended claim for this purpose.

In Figs. 1 through 5, I show a propeller blade comprising a shank 14 of cylindrical form adapted for mounting in the blade socket of a propeller hub, such as that shown at 16, in Fig. 5. The hub, as is well known in the art, may be provided with mechanism for turning the propeller blade about its own axis for pitch change. Immediately outboard of the shank 14 is a platform 18 which preferably lies adjacent the outer end of the hub socket 19 of the hub 16. From this platform, a pair of blade elements 20 and 22 extend radially outward, these airfoils being disposed in reverse staggered biplane configuration as indicated in the sections of Figs. 2 through 4. Preferably, the gap between the airfoils 20 and 22 will be sufficient to cause minimum aerodynamic interference between the blade elements so that their aerodynamic efficiency will be high. These blade elements replace the conventional substantially cylindrical shank of the ordinary propeller blade and yet provide adequate structure to support the outer blade portion shortly to be described. By virtue of the biplane configuration, adequate beam strength results from the paired airfoils along with adequate cross section of material to support them and the outer blade portion to sustain centrifugal loading. In Fig. 1, the leading edge of the blade element 20 is indicated at 24 while its trailing edge is indicated at 26. The leading edge of the blade element 22 is shown at 28 while its trailing edge is indicated at 30. If desired, these blade elements may be variable in thickness and chord as they extend outwardly, as shown, or they may be substantially uniform in section from their inner ends to their outer ends. Across the outer ends 32 and 34 of the elements 20 and 22, a bridge plate 36 is secured, said bridge plate if desired, extending beyond the confines of the airfoil forms of the elements to provide a plate which minimizes end loss from the inner blade elements. Further, the plate 36 may be streamlined as shown in Fig. 1, and may be curved in concentricity with the propeller.

Extending outwardly from the plate 36 is a main blade 38 having a leading edge 40 and a trailing edge 42, said blade, if desired, being of hollow metal construction as indicated in Fig. 2. The blade 38 may have its leading edge 40 substantially overlying the leading edge 24 of the blade element 20, while the trailing edge 42 of the blade 38 may overlie the trailing edge 30 of the inner blade element 22. Thereby, the stress distribution throughout the blade will be favorable since the centrifugal loads from the blade 38 will be assumed along substantially radial lines into the propeller blade shank. Adequate fillets are indicated at the joints of the various blade elements to reduce stress concentrations.

In Fig. 2, it is indicated that the pitch of the blade elements 20 and 22, immediately inboard of the plate 36, is greater than the pitch of the blade 38 immediately outboard of the plate 36. This arrangement may be desirable to augment the air pumping effect of the inboard biplane blade elements where they lie directly in front of a nacelle cowl opening as indicated in Fig. 5. Should this pitch differential between the outer and inner blade be unnecessary, there may be a smooth transition in pitch in accordance with the normal twist of propeller blades, from the shank to the tip as will be referred to in connection with subsequent figures.

Referring briefly to Fig. 5, the biplane blade elements 20 and 22 lie substantially directly ahead of an air entrance opening 46 of a nacelle 48, embracing in usual fashion, a power plant (not shown) from which a propeller shaft 50 extends forwardly to carry the propeller hub 16. If desired, a small spinner 52 may embrace the propeller hub 16. It will be seen that, by this arrangement, the blade elements 20 and 22 lie immediately ahead of the opening 46 and because of their pitched airfoil configuration, are highly effective for forcing air into the nacelle 48. In previous constructions, it has been proposed to equip propeller hubs with comparatively small diameter fans operating either at propeller speed or at greater than propeller speed to force air into nacelles. Such fans had to overcome the inherent drag in the unpitched cylindrical shanks of propeller blades and merely added extra complication and weight. With this invention, fans may be dispensed with since the inner blade portions described comprise in effect a cooling fan.

If there is no demand for cooling air for a nacelle, the inner biplane portions of the propeller blade are still highly effective in reducing propeller drag and increasing its propulsive effect.

Reference may now be made to Figs. 6 through 12, which show an alternative form of propeller blade. In this embodiment, the blade 54 is shown as comprising a cylindrical shank portion 56 for securement in the blade hub socket 19, the outer end of the shank being blended into two biplane blade elements 58 and 60 at a zone 62. The outer ends of the biplane blade elements 58 and 60 are bridged as at 64 by blade structure and from the central portion of the bridge 64 a propeller blade 66 extends outwardly. The bridge portion 64 is formed to provide smooth transition from the biplane elements 58 and 60 to the single blade element 66 to enable good stress distribution, to minimize aerodynamic drag and in part, to provide means for minimizing end loss from the blade portions 58 and 60. The airfoil form of the elements 58 and 60 is indicated in the section of Fig. 10. The blade form of the outer blade portion 66 is indicated in Figs. 7, 8 and 9 and it will be noted that in its final form, the blade will have the usual twist whereby the blade outer portions are pitched to comparatively small degree while the blade inner portions are comparatively steeply pitched. As is well known in the art, this twist is imparted to blades so that in operation, the effective angle of attack of each blade increment is the same with respect to the relative wind which is made up of the forward air speed component and the linear speed due to rotation of each increment of the propeller blade. The latter becomes greater as the sections are taken from blade root toward blade tip.

Figs. 6 through 12 show a blade planform of more modern concept than that shown in Fig. 1 whereby increased ease of manufacture along with little or no sacrifice in blade efficiency is attained. As noted above, Figs. 11 and 12 respectively show blade planform and blade edge form without twist, whereas Fig. 6 shows the blade with twist incorporated, the blade being of left hand rotation and the axis of rotation lying in the plane of the drawing as indicated. With respect to Figs. 7 through 10, rotational axes are indicated. Throughout, rotational axes are designated by the number 70. In general, it is contemplated that the biplane portion of the propeller blade will occupy between ¼ and ½ of the propeller diameter nearest to the center of rotation while the conventional propeller blade extending beyond the biplane portions, will occupy from ½ to ¾ of the entire propeller diameter. These proportions are not intended to be limiting since it will depend upon the installation with which the propeller is to be used as to the relative size of the inboard and outboard propeller blade elements.

Any differential in pitch between the biplane blade portions and the monoplane blade portions is a matter of design to obtain best efficiency in the environment in which the propeller is to be used. This specific blending of the shank into the biplane blade portions and of the biplane blade portions into the monoplane blade portions is largely a matter of design to obtain best aerodynamic effect along with adequate structural integrity against aerodynamic, centrifugal and vibrative loads imposed on the propeller structure.

Though but two embodiments illustrating the principles of the invention have been illustrated and described, it is to be understood that the invention may be applied in various forms. Changes may be made in the arrangements shown without departing from the spirit of the

What is claimed is:

An aeronautical propeller blade comprising an elongated cylindrical shank whose length is greater than its diameter, said shank comprising means for securement of the blade in a hub, and having an outer end portion comprising a flange larger in diameter than the shank, a plurality of blade elements extending outwardly from said shank and flange and integral therewith, said elements each having airfoil cross-section and having a substantial gap or spacing from one another to allow of air flow therebetween, the ends of said elements next to said flange lying within the compass of said flange, and said elements as they extend outwardly from said flange retaining at least as great a gap relation to one another as they have at said flange ends, a bridge portion substantially normal to said blade elements and secured integrally to each of them at their outer ends, said bridge portion being at least of such size as to embrace the leading and trailing edges of both said blade elements, and a single blade element of greater chord than either of said first mentioned blade elements integrally secured to and extending outwardly from said bridge portion, said single blade element having its leading edge forming a substantial prolongation of the leading edge of one of said first blade elements, beyond said bridge portion, and said single blade element having its trailing edge forming a substantial prolongation of the trailing edge of another of said first blade elements, beyond said bridge portion; said blade in its entirety, from the structural relationship of the components, having continuous, substantially alined stress flow lines from the blade shank through said plurality of blade elements and bridge portion to said single blade element along leading and trailing edges thereof.

ELMER G. GRIESE.

REFERENCES CITED

The following references are of record in the file of this patent:

UNITED STATES PATENTS

| Number | Name | Date |
| --- | --- | --- |
| 634,885 | Glover | Oct. 17, 1899 |
| 1,886,891 | Martens | Nov. 8, 1932 |
| 2,046,538 | Vargas | July 7, 1936 |
| 2,125,187 | Lansing | July 26, 1938 |
| 2,193,616 | Baumann | Mar. 12, 1940 |
| 2,344,266 | Reissner | Mar. 14, 1944 |